(12) United States Patent
Boroch

(10) Patent No.: US 7,476,060 B2
(45) Date of Patent: Jan. 13, 2009

(54) BULK MATERIAL HANDLING SYSTEM AND PORTABLE LOADING APPARATUS THEREOF

(75) Inventor: Anthony Boroch, Montoursville, PA (US)

(73) Assignee: The Young Industries, Inc., Muncy, PA (US)

( * ) Notice: Subject to any disclaimer, the term of this patent is extended or adjusted under 35 U.S.C. 154(b) by 510 days.

(21) Appl. No.: 11/214,883

(22) Filed: Aug. 31, 2005

(65) Prior Publication Data

US 2007/0048110 A1    Mar. 1, 2007

(51) Int. Cl.
*E02B 11/00* (2006.01)

(52) U.S. Cl. .......................... 406/39; 406/43; 414/343; 414/345

(58) Field of Classification Search .................. 406/39, 406/43, 141, 186; 414/343, 344, 345
See application file for complete search history.

(56) References Cited

U.S. PATENT DOCUMENTS

| | | | | |
|---|---|---|---|---|
| 4,200,422 A * | 4/1980 | Stodt | ............................. | 414/304 |
| 4,733,619 A * | 3/1988 | Maeda et al. | ................ | 110/229 |
| 4,773,797 A * | 9/1988 | Merz | ............................ | 406/156 |
| 4,812,086 A * | 3/1989 | Kopernicky | ................... | 406/153 |
| 4,900,200 A * | 2/1990 | Harumoto et al. | .............. | 406/93 |
| 5,584,615 A * | 12/1996 | Micklich | ...................... | 406/109 |
| 5,996,171 A * | 12/1999 | Bowers | ....................... | 15/340.1 |
| 6,345,936 B2 * | 2/2002 | Pfeiffer | ........................ | 406/197 |
| 6,623,233 B2 * | 9/2003 | Peveling | ....................... | 414/526 |
| 6,782,835 B2 * | 8/2004 | Lee et al. | ..................... | 111/174 |
| 6,939,122 B2 * | 9/2005 | Rowland et al. | ............. | 425/448 |
| 6,971,786 B2 * | 12/2005 | Krambrock | ............... | 366/165.1 |
| 7,229,242 B2 * | 6/2007 | Bell et al. | ..................... | 414/810 |
| 7,323,022 B1 * | 1/2008 | Redlin | .......................... | 55/319 |

* cited by examiner

Primary Examiner—Douglas A Hess
(74) *Attorney, Agent, or Firm*—Novak Druce & Quigg LLP

(57) ABSTRACT

A bulk material system generally consisting of a container having an upper wall, a vertical wall and an opening in the vertical wall; a support frame detachably mountable on the upper and vertical walls of the container; a hopper mounted on the support frame; a material conveying conduit mounted on the frame having an inlet communicating with an outlet of the hopper for receiving material therefrom and an end portion with an outlet insertable through the vertical wall opening of the container when the frame is detachably mounted on the container; and a conduit supported on the support frame having an outlet communicating with the material conveying conduit and an inlet communicable with a source of gas under pressure, function to supply gas under pressure to the material conveying conduit for pneumatically conveying material fed from the hopper into the material conveying conduit, therethrough, into the container.

21 Claims, 3 Drawing Sheets

BULK MATERIAL HANDLING SYSTEM AND PORTABLE LOADING APPARATUS THEREOF

This invention relates to a bulk material handling system. It further contemplates a portable apparatus for loading such material into a container.

BACKGROUND OF THE INVENTION

Bulk materials commonly used in various manufacturing processes typically are transported in intermodal containers mountable on flat beds of motor vehicles, railway cars and ship holds for shipping. Because of the poor flow characteristics of many of such materials, pneumatic conveying methods commonly are employed for loading such materials into containers. The use of such methods, however, requires not only the handling of large volumes of air for conveying the materials but the venting of such air and the removal of airborne particles of such material entrained in the vented air so as not to pollute or contaminate the working environment. Typically, equipment used for such loading operations are located at fixed sites not always readily accessible to the containers to be loaded. Accordingly, it is the principal object of the present invention to provide a system for handling bulk materials consisting of a transportable container and an apparatus for loading such material into such a container which is portable and therefore readily relocatable to accommodate containers situated at different locations.

SUMMARY OF THE INVENTION

The principal object of the present invention is achieved by providing a bulk material handling system generally consisting of a container having an upper wall, a side wall and an opening in such side wall; a support frame detachably mountable on the upper and side walls of the container; a hopper mounted on the frame; a material conveying conduit mounted on the frame having an inlet communicating with an outlet of the hopper for receiving material therefrom and an end portion provided with an outlet, insertable through a side wall opening of the container when the frame is detachably mounted on the container; and a conduit supported on the frame having an outlet communicating with the material conveying conduit and an outlet communicable with a source of gas under pressure, functional to supply gas under pressure to the material conveying conduit for pneumatically conveying material fed from the hopper into the material conveying conduit, therethrough, into the container. The loading apparatus is portable, having a pair of slots for receiving the blades of a forklift truck for transporting, lifting and lowering the apparatus or a lower frame section mounted on a set of casters or other rolling means, an upper frame section on which the hopper and material conveying conduit are mounted, vertically displaceable relative to the lower frame section, and means for raising and lowering the upper frame section. Preferably, the apparatus further includes means for supplying fluidizing air to the hopper and material conveying conduit for enhancing the flow of material, and a conduit having an inlet insertable into the opening of the container and an outlet communicable with a dust collection system for venting the conveying air introduced into the container and removing material particles entrained in the vented air.

DETAILED DESCRIPTION OF THE EMBODIMENTS OF THE INVENTION

Figure 1:
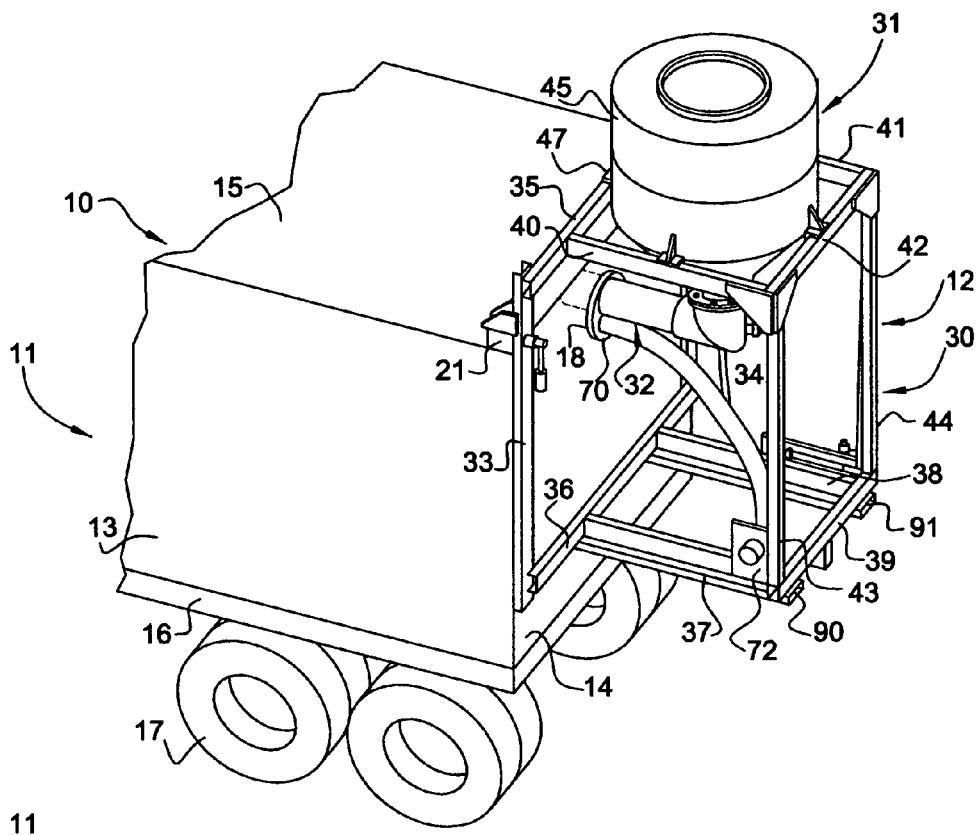
FIG. 1 is a perspective view of a system for handling bulk material consisting of a transportable container and a portable loading apparatus, having a portion thereof broken away.

Referring to FIG. 1 of the drawings, there is illustrated a material handling system 10 which generally includes a container 11 and a bulk material loading apparatus 12. Container 11 is of a rectangular configuration including a bottom wall, a pair of side walls 13, 13, a front wall, a rear wall 14 and a top wall 15. The container is of an intermodal type which may be transported on the bed of a motor vehicle, a railway car or in a ship hold. In the embodiment shown, the container is supported on the flat bed of a vehicle chassis 16 mounted on sets of wheels 17. Disposed within container 11 is a flexible liner formed of a plastic material for holding the bulk material loaded into the container, which is provided with a fill neck. Access to the fill neck of the liner is provided through a closable opening 18 formed in the upper, center portion of rear wall 14 of the container.

Figure 5:
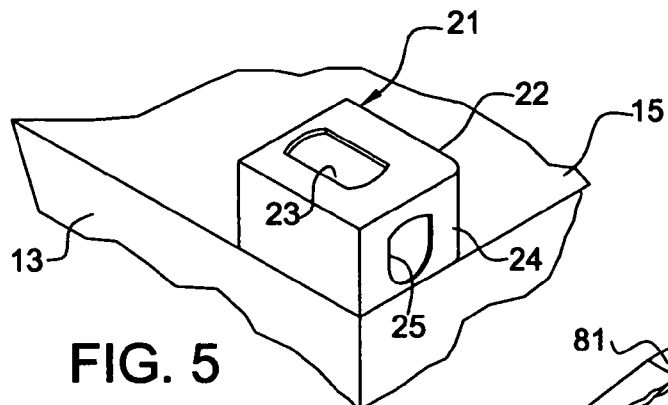
FIG. 5 is a partial, enlarged perspective view of the portion of the container designated by the reference numeral 6 in FIG. 4, illustrating a mounting block on the container cooperable with a component of the portable loading apparatus for locking the portable loading apparatus to the container when the apparatus is detachable mounted on the container.

Rigidly secured to the rear corners of upper wall 15 of the container is a pair of mounting blocks 21, 21. As best shown in FIG. 5, each of the mounting blocks has a substantially rectangular configuration and includes an upper side 22 provided with a substantially oblong, longitudinally extending recess 23, and a rear, vertical surface 24 lying substantially in the same plane as rear wall 14, provided with a substantially oblong configured, vertically extending recess 25. Mounting blocks 21, 21 serve as means for detachably mounting apparatus 12 on container 12 and locking the apparatus in the mounted position in a manner to be described.

The mounting blocks are standard features on intermodal freight containers used in commerce. Typically, there is such a block on every corner of each such container. The blocks conform to ISO Standard 1161. The container dimensions are also governed by ISO Standard 668 which enables interchangeability of containers to which the loading apparatus may be attached.

Apparatus 12 generally consists of a support frame 30 having a hopper 31 and a material conveying conduit 32 mounted thereon. As best seen in FIG. 1, the frame includes a pair of vertically disposed, laterally spaced beams 33 and 34, a pair of upper and lower cross beams 35 and 36, a pair of longitudinally disposed, laterally spaced beams 37 and 38 extending rearwardly from cross beam 36 and connected at their rear ends by a cross beam 39, a pair of longitudinally disposed, transversely spaced beams 40 and 41 secured at their front ends to cross beam 35, projecting rearwardly and connected at their rearward ends by a cross beam 42 and a pair of vertically disposed, transversely spaced beams 43 and 44 interconnecting upper and lower cross beams 42 and 39, to form a integral structure.

Figure 2:
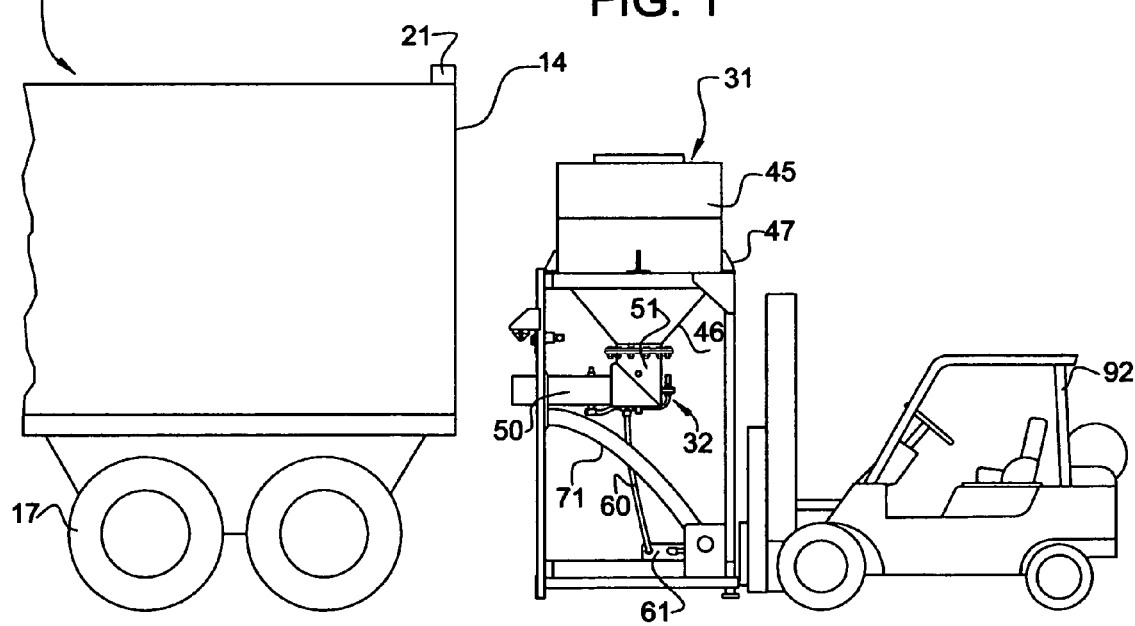
FIG. 2 is a side elevational view of the system shown in FIG. 1 illustrating the portable loading apparatus detached from the container and supported on a forklift truck.

Hopper 31 is of a conventional configuration including a cylindrical upper section 45 and a lower, inverted frusto-concially configured section 46. The hopper is supported on the frame structure by means of a plurality of brackets 47 projecting radially about the cylindrical section 45 and seated on beams 35, 40, 41 and 42. Material conveying conduit 32 includes a longitudinally disposed section 50, also disposed radially relative to the axis of hopper section 45 and a transitional section 51 having an inlet communicating with the outlet of the hopper and an outlet communicating with conduit section 50. As best seen in FIG. 2, the forward end portion of conduit section 50 projects beyond the plane defined by beams 33 and 34 and cross beams 35 and 36. Hopper 31 and material conveying conduit 32 operate in a manner whereby bulk material deposited in hopper 31 will gravity flow into conduit 32 and be pneumatically conveyed through conduit 32 and be ejected through the outlet of the conduit in the conventional manner. Such assembly functions in the manner as described in U.S. Pat. Nos. 6,609,871, 6,682,290 and 6,719,500 which are incorporated herein by reference. Air or another gas under pressure is supplied to the material conveying conduit and possibly the hopper through a line 60 secured at one end thereof to a bracket 61 provided at a lower end of the support frame, and having an inlet connected to a source of gas under pressure, and an end having one or more outlets and possibly pressure regulating valves for supplying a gas under pressure for pneumatically conveying material through conduit 32 and supplying fluidizing gas in conduit 32 and possibly hopper 31 for enhancing the flow of material therethrough.

For securing the fill neck to the material conveying conduit and forming a seal therebetween, there is provided a plate 70 on the conduit section 50, spaced from the free end thereof and lying substantially in the plane of beams 33, 34, 35 and 36. Such plate further supports an end of a hose 71 having an inlet communicating an opening in plate 70. The other end of hose 71 is supported on a plate 72 positioned on a lower rear end of the support frame, having an outlet connectable to a dust collection system for purposes to be described.

Figure 4:
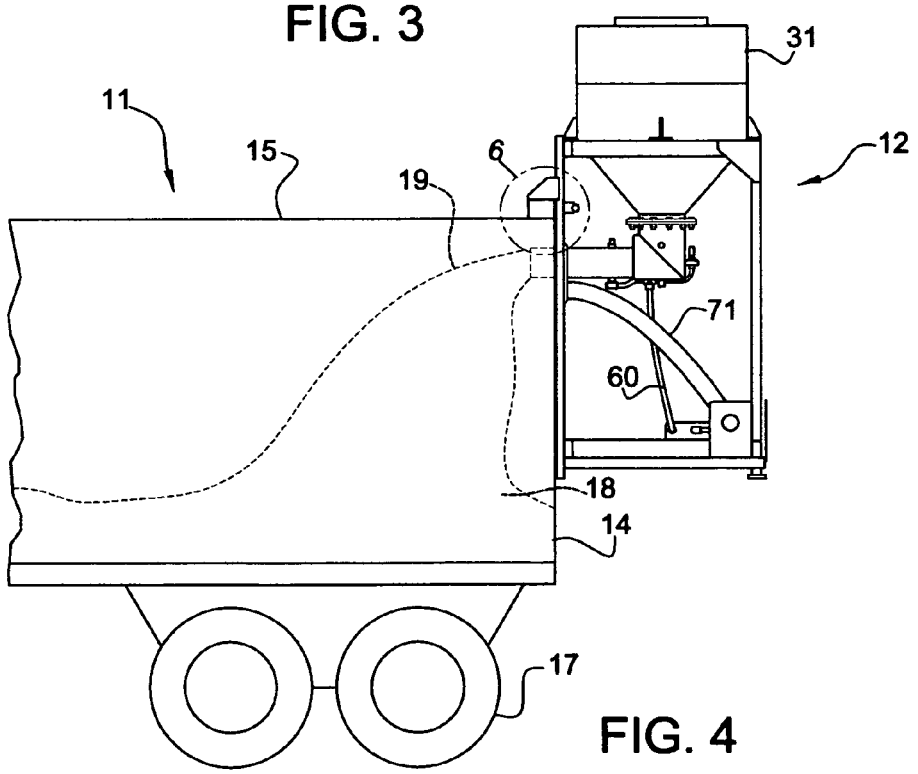
FIG. 4 is a view similar to the view shown in FIG. 3, illustrating the portable loading apparatus detachably mounted on the container, with the forklift truck having been removed.
Figure 6:
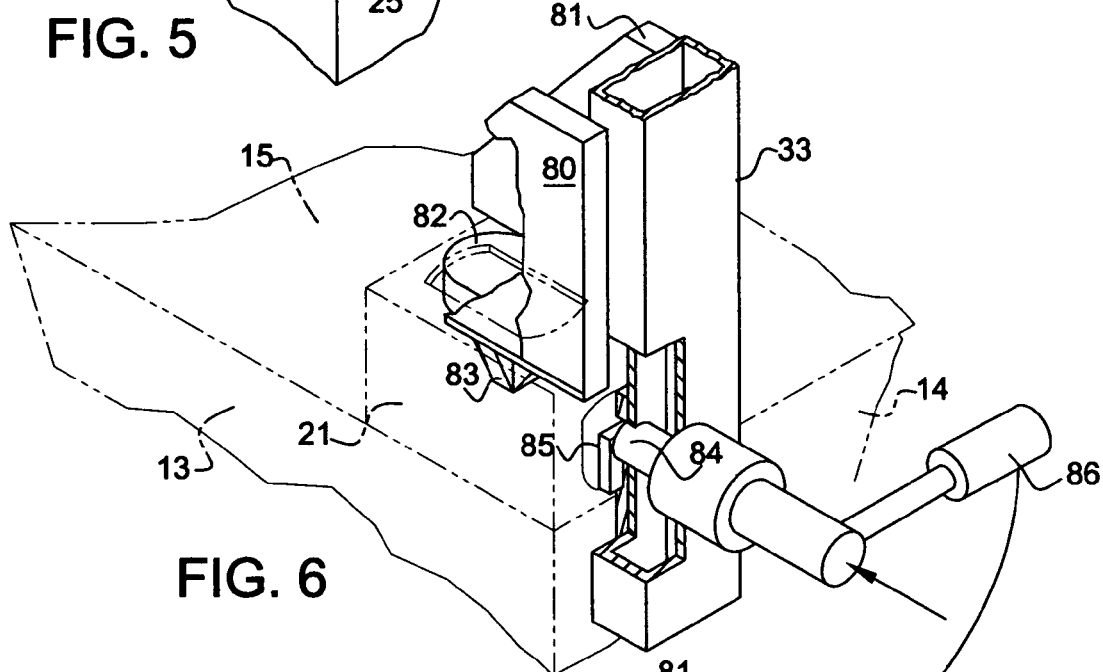
FIG. 6 is a view similar to the view shown in FIG. 5, illustrating the container portion in phantom lines and the cooperating portion of the apparatus for locking the apparatus to the container in solid lines, having portions of such component broken away, prior to locking such components together.
Figure 7:
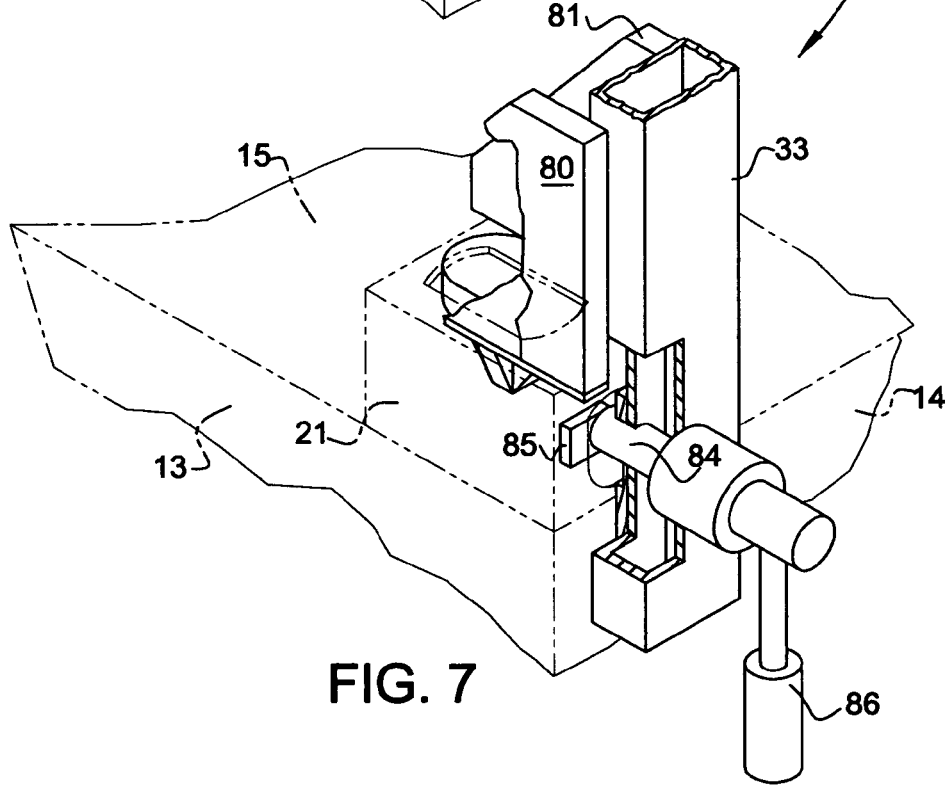
FIG. 7 is a view similar to the view shown in FIG. 5, illustrating the components thereof in the locked condition.

Referring to FIGS. 6 and 7, each of vertical beams 33 and 34 of the support frame is provided with an assembly of components cooperable with a mounting block 21 for detachably mounting apparatus 21 on container 11 in the manner as shown in FIG. 4, and locking the apparatus thereto. With regard to the assembly disposed on the upper end of vertical beam 33, there is provided a pair of brackets 80 and 81 secured to beam 33 and extending forwardly therefrom, and a lower bracket 82 spanning the lower ends of brackets 80 and 81. Depending from bracket 82 is an attachment pin 83 which is adapted to be received within recess 23 of mounting block 21. As best shown in FIGS. 6 and 7, attachment pin 83 has a converging or downwardly pointing configuration to facilitate its positioning relative to insertion into recess 23. Recess 23 further is provided with an elongated configuration to further facilitate the insertion of attachment pin 83 therein. At a level just below bracket 82, beam 33 is provided with a longitudinally disposed opening and a sleeve rigidly mounted on the outer side of the beam, coaxially with such opening. Journaled in such sleeve and extending through such opening is a shaft 84 provided with a latch 85 disposed at a forward end thereof and a handle 86 disposed at a rearward end thereof. The length of the shaft is sufficient so that it projects forwardly of beam 33 and rearwardly of the attached sleeve. The size and configuration of latch 45 is such that when the support frame is mounted on the container with attachment pin 82 received in opening 23 of the mounting block and handle 86 is in the position as shown in FIG. 6, latch 85 will be longitudinally aligned with opening 25 of the mounting block. With the attachment device thus positioned, handle 86 may be gripped and maneuvered to move shaft 84 forwardly thus inserting latch 85 through opening 25, and then rotated 90° to cause the support frame to be latched to the container as shown in FIG. 7. As such mounting occurs, the forward end of the material conveying conduit will be caused to be inserted through opening 18 in the rear wall of the container to further position plate 70 against the rear wall of the container.

For lifting, lowering and transporting the apparatus, the support frame thereof is provided with a pair of longitudinally disposed, transversely spaced members 90 and 91 providing a pair of slots for inserting a pair of blades of forklift truck 92. It will be appreciated that in accordance with the conventional manner, the forklift truck may be maneuvered to insert the blades thereof into members 90 and 91 and thus mount the apparatus on the forklift truck, and the forklift truck may be operated in the conventional manner to lift and lower the apparatus and transport or position it.

Figure 3:
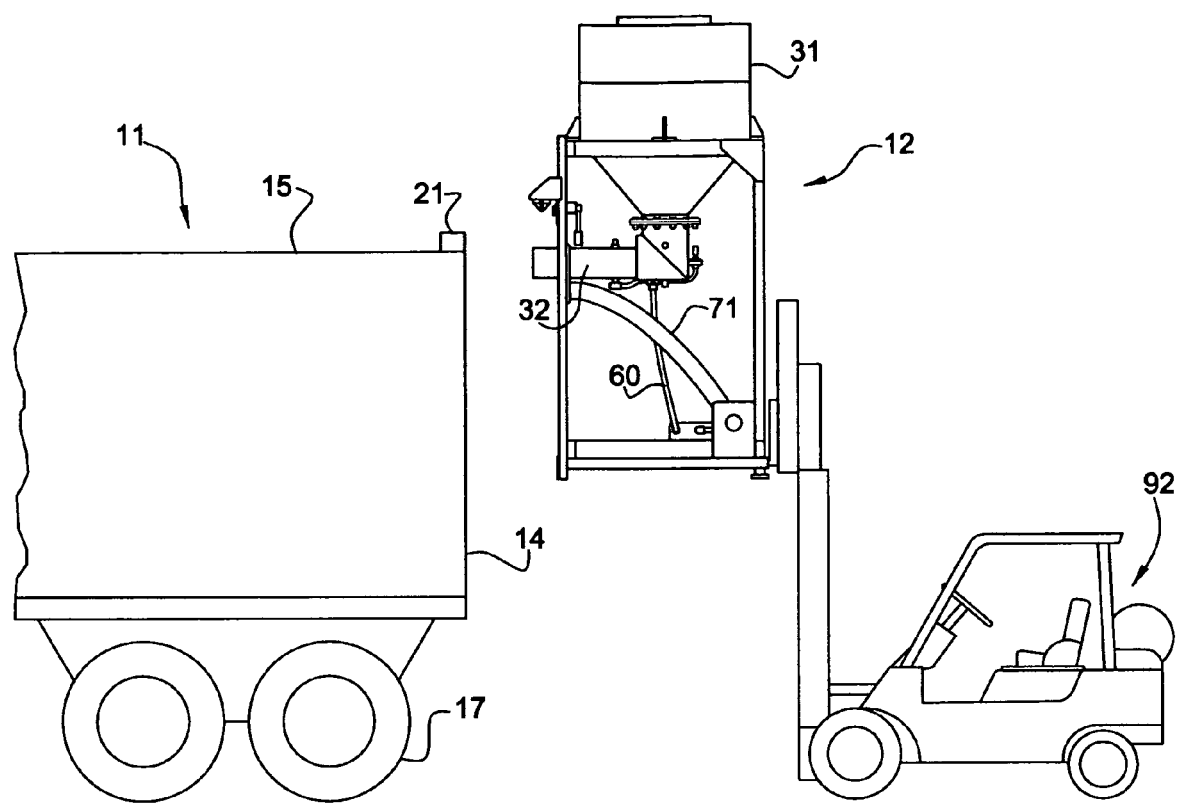
FIG. 3 is a view similar to the view shown in FIG. 2, illustrating the portable loading apparatus in an elevated position about to be detachably mounted on the container.

With the container positioned as shown in FIG. 2, equipped with a liner having a fill neck either extending through opening 18 in the rear wall thereof or readily accessible to such opening, such liner may be filled with a bulk material utilizing apparatus 12 by first mounting the apparatus on the front end of the forklift truck as shown in FIG. 2, operating the forklift truck to position the apparatus behind the container and aligned in a vertical plane with opening 18, lifting the apparatus to the position shown in FIG. 3 with the attachment pins being longitudinally aligned with the recesses in the mounting blocks and at an elevation slightly higher thereof and then manipulating the support frame by advancing it forwardly and lowering it to insert attachment pins 83 in recesses 23 of the mounting blocks and aligning the forward ends of shafts 84 and latches 85 with recesses 25 of the mounting blocks, with the forward end of the material conveying conduit inserted in opening 18. With the support frame thus positioned and latches 85 longitudinally aligned with openings 25, as shown in FIG. 6, the handles of the latching devices are gripped and moved forwardly to insert latches 85 through openings 25, and then rotated 90° to latched position as shown in FIG. 7.

Prior to the final mounting of the support frame on the container and the insertion of the front end of the material conveying conduit into the container, the fill neck of the liner is drawn through opening 18 and secured to plate 70 to intercommunicate the material conveying conduit and the interior of the liner to be filled and further to form a seal therebetween. With the fill neck of the liner securely attached to plate 70, the front end of the material conveying conduit inserted within the liner in the container and the support frame mounted on the container with each locking lever in a position as shown in FIG. 6, the locking levers on both sides of the support frame may be rotated 90° to a position as shown in FIG. 7 to lock the apparatus to the container.

With the apparatus thus mounted on the container as shown in FIGS. 1 and 4, bulk material to be loaded into the liner of the container may be fed into the hopper, conduit 60 is connected to the source of gas under pressure and hose 71 is connected to a dust collection system. In operation, bulk material in the hopper will be gravity fed into the material conveying hopper where it will be pneumatically conveyed into the liner of the container. Fluidizing air to the hopper and the conveying conduit will function to enhance the flow of material. Air injected into the liner will be vented through hose 71 and airborne particles of the material carried by the vented air will be removed and recovered by the dust collection system.

When the loading operation has been completed, the apparatus may be detached from the container and removed simply by detaching the connections to the air supply and dust collection system, detaching the fill neck of the liner from the material conveying conduit and sealing off the fill neck, rotating the locking levers 90° and retracting them to release the apparatus from the container, operating the forklift truck to detach the apparatus from the container and then transporting the apparatus to a storage or other site.

Although the aforementioned embodiment of the invention has been described in connection with the use of a forklift truck for lifting and positioning the apparatus for attachment to the container, it is to be understood that other means may be utilized for lifting, positioning and detachably mounting the apparatus to the container. As an example, the support frame of the apparatus may consist of a lower frame section mountable on a set of casters or wheels, an upper section on which the hopper and material conveying conduit are mounted and which is vertically displaceable relative to the lower section and means for raising and lowering the upper section.

The system and apparatus as described, provides an inexpensive, convenient and effective means for loading bulk materials into containers. The apparatus may be easily transported from one site to another, readily attached and detached and used effectively and easily to fill a container. It is easily connectable to compressed air and dust collection systems normally available at sites handling bulk materials and is effective in avoiding pollution or contamination of working areas. Its portability readily permits it to become accessible to containers to be loaded and repositioned to other loading or storage sites with the least amount of time and effort. Because of the simplicity of its design, it may be easily and inexpensively fabricated.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A bulk material handling system comprising:
   a container having an upper wall, side walls and an opening in one of said side walls;
   a support frame detachably mountable on said upper and one of said side walls of said container;
   a hopper mounted on said support frame;
   a material conveying conduit mounted on said support frame having an inlet communicating with an outlet of said hopper for receiving material therefrom and an end portion provided with an outlet insertable through said side wall opening of said container when said frame is detachably mounted on said container; and
   a conduit supported on said support frame having an outlet communicating with said material conveying conduit and an inlet communicable with a source of gas under pressure, functional to supply said gas under pressure to said material conveying conduit for pneumatically conveying material fed from said hopper into said material conveying conduit, therethrough, into said container.

2. A system according to claim 1 wherein said container is transportable.

3. A system according to claim 1 including a liner disposed within said container having an opening communicable with said material conveying conduit when said support frame is detachably mounted on said container.

4. A system according to claim 1 including a conduit mounted on said frame having an inlet communicable with said opening in said side wall when said support frame is detachably mounted on said container, and an outlet communicable with a dust collection system.

5. A system according to claim 1 including means connectable to a source of gas under pressure for supplying a fluidizing gas to at least one of said hopper and one of said material conveying conduit.

6. A system according to claim 1 including a plate mounted on and encompassing an end portion of said material conveying conduit, and a liner disposed in said container having a fill neck detachably connectable about said plate to intercommunicate said material conveying conduit and the interior of said liner.

7. A system according to claim 6 including a conduit mounted on said support frame having an inlet communicating with an opening in said plate, and an outlet communicable with a dust collection system.

8. A system according to claim 1 wherein said support frame includes means for receiving the blades of a forklift truck for transporting said support frame.

9. A system according to claim 1 including means for locking said support frame detachably mounted on said container.

10. A system according to claim 1 wherein said container is intermodal.

11. An apparatus according to claim 1 wherein said support frame includes a lower section mounted on rolling means for transporting said apparatus, an upper section supporting said hopper and material conveying conduit and means for vertically displacing said upper section relative to said lower section.

12. An apparatus for loading a bulk material into a container having an upper wall and a side wall provided with an opening comprising:
    a support frame detachably mountable on said upper and side wall of said container; a hopper for holding bulk material mounted on said support frame;
    a material conveying conduit mounted on said support frame having an inlet communicating with an outlet of said hopper for receiving material therefrom and an end portion with an outlet insertable through said side wall opening of said container when said support frame is detachably mounted on said container; and
    a conduit supported of said support frame having an outlet communicating with said material conveying conduit and an inlet communicable with a source of gas under pressure, functional to supply a gas under pressure to said material conveying conduit for pneumatically conveying material fed from said hopper into said material conveying conduit, therethrough, into said container.

13. An apparatus according to claim 12 including a conduit mounted on said support frame having an inlay communicable with said side wall opening when said frame is detachably mounted on said container, and an outlet communicable with a dust collection system.

14. An apparatus according to claim 12 including a plater mounted on and encompassing the end portion of said material conveying conduit, about which a fill neck of a liner may be detachably connected to intercommunicate said material conveying conduit and the interior of said liner.

15. An apparatus according to claim 12 including a conduit mounted on said support frame having an inlet communicating with an opening in said plate and an outlet communicable with a dust collection system.

16. An apparatus according to claim 12 wherein said support frame includes means for receiving the blades of a forklift truck for lifting, lowering and transporting said apparatus.

17. An apparatus according to claim 12 including means operatively connectable to said container for locking said apparatus to said container.

18. An apparatus according to claim 12 wherein said support frame includes at least one projecting member having a depending attachment pin receivable in an upwardly opening recess in said upper wall of said container when said apparatus is detachably mounted on said container.

19. An apparatus according to claim 12 wherein said support frame includes at least one shaft rotatably mounted therein, having a radially projecting latch portion provided at a leading end thereof, insertable in an elongated opening in said side wall when said support frame is detachably mounted on said side wall of said container, and a handle portion which may be operated to rotate said shaft and correspondingly said latch thereof into a locking position, when said frame is detachably mounted on said side wall of said container and said latch portion of said shaft is inserted into said elongated opening in said side wall of said container.

20. An apparatus according to claim 19 wherein said support frame includes at least one projecting member having a depending attachment pin receivable in an upwardly opening recess in said upper wall of said container when said apparatus is detachably mounted on said container.

21. An apparatus according to claim 20 wherein said recesses are disposed in a mounting block, and there are two of said mounting blocks, each mounted on an upper corner of said container.

\* \* \* \* \*

UNITED STATES PATENT AND TRADEMARK OFFICE
CERTIFICATE OF CORRECTION

PATENT NO. : 7,476,060 B2  Page 1 of 1
APPLICATION NO. : 11/214883
DATED : January 13, 2009
INVENTOR(S) : Anthony Boroch It is certified that error appears in the above-identified patent and that said Letters Patent is hereby corrected as shown below:

Col. 6, in claim 5, line 3, "one of", second occurrence, should be deleted.

Col. 7, in claim 13, line 2, "inlay" should be deleted and "inlet" should be inserted.

Col. 7, in claim 14, line 1, "plater" should be deleted and "plate" should be inserted.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,476,060 B2  
APPLICATION NO. : 11/214883  
DATED : January 13, 2009  
INVENTOR(S) : Anthony Boroch Page 1 of 1

It is certified that error appears in the above-identified patent and that said Letters Patent is hereby corrected as shown below:

Col. 6, in claim 5, line 25, "one of", second occurrence, should be deleted.

Col. 7, in claim 13, line 4, "inlay" should be deleted and --inlet-- should be inserted.

Col. 7, in claim 14, line 8, "plater" should be deleted and --plate-- should be inserted.

This certificate supersedes the Certificate of Correction issued March 24, 2009.

Signed and Sealed this

Fourteenth Day of April, 2009

JOHN DOLL  
*Acting Director of the United States Patent and Trademark Office*